US008027078B2

(12) United States Patent
Cho et al.

(10) Patent No.: US 8,027,078 B2
(45) Date of Patent: Sep. 27, 2011

(54) DISPLAY DEVICE USING MEMS ELEMENT AND MANUFACTURING METHOD THEREOF

(75) Inventors: Hyun-Min Cho, Seoul (KR); Sung-Jin Kim, Seongnam-si (KR); Yu-Kwan Kim, Incheon-si (KR); Don-Chan Cho, Seongnam-si (KR); Seul Lee, Seoul (KR); Jae-Byung Park, Seoul (KR); Su-Gyeong Lee, Seongnam-si (KR); Seon-Tae Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/765,326

(22) Filed: Apr. 22, 2010

(65) Prior Publication Data
US 2011/0102876 A1 May 5, 2011

(30) Foreign Application Priority Data
Nov. 5, 2009 (KR) .................. 10-2009-0106622

(51) Int. Cl.
*G02B 26/00* (2006.01)
(52) U.S. Cl. .................................... 359/237
(58) Field of Classification Search ............ 359/237, 359/238, 245, 248, 254, 223, 224, 290, 295, 359/298, 318; 345/108
See application file for complete search history.

(56) References Cited

U.S. PATENT DOCUMENTS

| 7,675,665 | B2 * | 3/2010 | Hagood et al. ............... 359/233 |
| 7,706,073 | B2 * | 4/2010 | Munro .......................... 359/627 |
| 2006/0066805 | A1 | 3/2006 | Grunnet-Jepsen et al. |

FOREIGN PATENT DOCUMENTS

| JP | 2003-202567 | 7/2003 |
| JP | 2005-275061 | 10/2005 |
| KR | 1998-0076675 | 11/1998 |
| KR | 2001-0100566 | 11/2001 |
| KR | 2004-0058240 | 7/2004 |
| KR | 2006-0004590 | 1/2006 |
| KR | 2006-0116102 | 11/2006 |
| KR | 2006-0118179 | 11/2006 |
| KR | 2007-0057192 | 6/2007 |
| KR | 2007-0114161 | 11/2007 |
| KR | 2008-0037072 | 4/2008 |

* cited by examiner

*Primary Examiner* — William Choi
*Assistant Examiner* — Tuyen Tra
(74) *Attorney, Agent, or Firm* — H.C. Park & Associates, PLC

(57) ABSTRACT

The present invention relates to a display device using a microelectromechanical system (MEMS) and to a manufacturing method thereof. A display device using a MEMS includes a first substrate comprising a first index of refraction; a second substrate facing the first substrate; a reflective layer formed on the first substrate and having a first aperture; a transparent layer covering the first aperture and comprising a second refractive index; and a shutter arranged on the second substrate, wherein a difference between the first refractive index and the second refractive index is equal to or less than 0.1.

22 Claims, 17 Drawing Sheets

DISPLAY DEVICE USING MEMS ELEMENT AND MANUFACTURING METHOD THEREOF

CROSS REFERENCE TO RELATED APPLICATION

This application claims priority from and the benefit of Korean Patent Application No. 10-2009-0106622, filed on Nov. 5, 2009, which is hereby incorporated by reference for all purposes as if fully set forth herein.

BACKGROUND OF THE INVENTION

1. Field of the Invention

Exemplary embodiments of the present invention relate to a display device using a microelectromechanical system (MEMS) and a manufacturing method thereof.

2. Discussion of the Background

Various flat panel displays have been researched as next generation display devices. A flat panel display is a display device that is thin compared with the size of the screen thereof, and a display device forming a minute modulator by using microelectromechanical system (MEMS) fabrication techniques for every pixel has recently been researched. The MEMS is a micro-minute processing technique, and an electronic device system produced therefrom has a size from several nanometers to several millimeters. Display devices using the MEMS may have a high photo-efficiency as compared with a liquid crystal display.

The display device using the MEMS includes a first display panel including an aperture passing light from a backlight unit, a second display panel facing the first display panel and including a shutter, and a space between the first display panel and the second display panel. The space between the first display panel and the second display panel is generally filled with a fluid such as a gas or an oil. Filling the fluid material and creating a display device using the MEMS, particularly a manufacturing process of a display device with a large display size, may be complicated, and the processing may take a long time. Problematically, the operation voltage of the display device may be increased, thereby increasing the power requirements of the display device.

SUMMARY OF THE INVENTION

Exemplary embodiments of the present invention provide a display device including a MEMS that may increase light emitting efficiency of the display device.

Additional features of the invention will be set forth in the description which follows, and in part will be apparent from the description, or may be learned by practice of the invention.

An exemplary embodiment of the present invention discloses a device using a microelectromechanical system (MEMS) that comprises a first substrate comprising a first index of refraction; a second substrate facing the first substrate; a reflective layer formed on the first substrate and having a first aperture; a transparent layer covering the first aperture and comprising a second refractive index; and a shutter arranged on the second substrate, wherein a difference between the first refractive index and the second refractive index is equal to or less than 0.1.

An exemplary embodiment of the present invention also discloses a method for manufacturing a display device using a MEMS that comprises forming a reflective layer comprising a first aperture on a first substrate; forming a transparent layer covering the first aperture; forming a shutter on a second substrate; and coupling the first substrate and the second substrate, wherein the first substrate comprises a first refractive index, the second substrate comprises a second refractive index, and a difference between the first refractive index and the second refractive index is equal to or less than 0.1.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
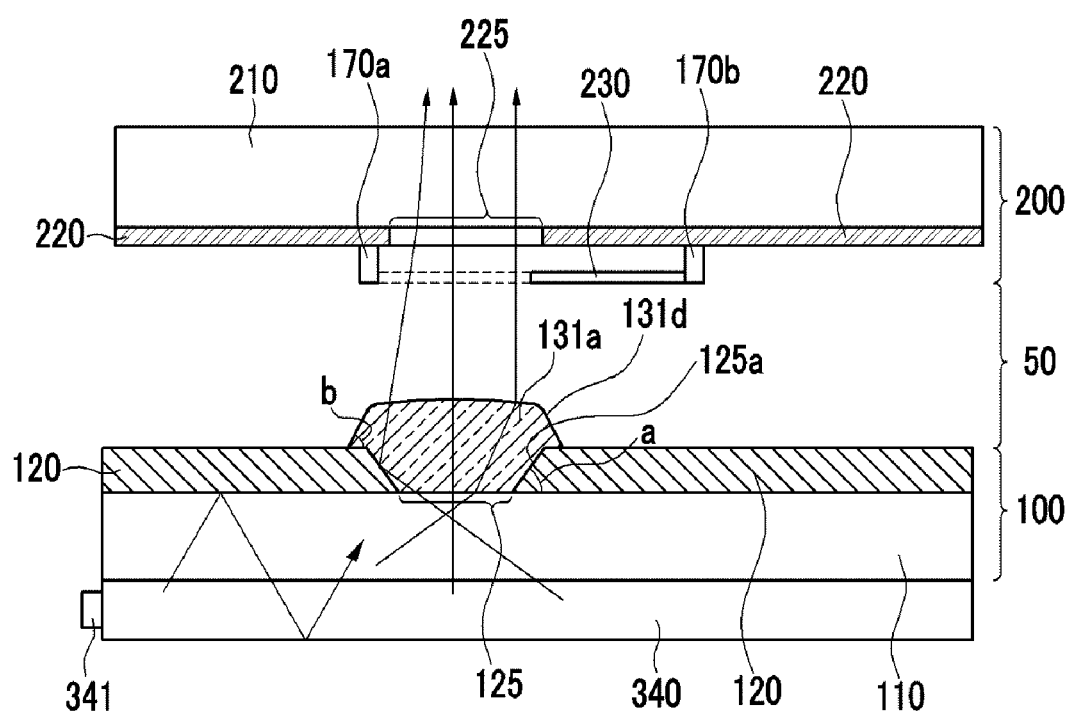
FIG. 1, FIG. 2, FIG. 3, FIG. 5, FIG. 7, FIG. 8, FIG. 9, FIG. 10, FIG. 11, FIG. 12, and FIG. 13 are cross-sectional views of a display device using a MEMS according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

First, a display device using a microelectromechanical system (MEMS) according to an exemplary embodiment of the present invention will be described with reference to FIG. 1.

FIG. 1 is a cross-sectional view of a display device using a MEMS according to an exemplary embodiment of the present invention.

A display device using a MEMS element includes a first display panel 100 and a second display panel 200 facing each other via a space 50, and a backlight unit 340.

The backlight unit 340 is attached at an outer surface of the first display panel 100, and includes a lamp unit 341 that emits light. The backlight unit 340 supplies the light from the lamp unit 341 propagating toward the two display panels 100 and 200. The lamp unit 341 may emit white light and may alternatively emit light of at least two primary colors. Examples of the primary colors are red, green, and blue. The lamp unit 341 may include a fluorescent lamp such as a cold cathode fluorescent lamp (CCFL), an external electrode fluorescent lamp (EEFL), or a light emitting diode (LED).

The first display panel 100 includes a first substrate 110, a reflective layer 120 formed on the first substrate 110, and a transparent body 131a formed on the reflective layer 120. The first substrate 110 may be made of a transparent insulating material such as transparent glass or plastic, and the refractive index thereof may be in the range of 1.2 to 1.6.

The reflective layer 120 includes an aperture 125, and the light from the backlight unit 340 may be emitted toward the second display panel 200 through the aperture 125. However, the light that is not transmitted through the aperture 125 is reflected by the reflective layer 120, travels toward the backlight unit 340, and may be again reflected at an inner surface (not shown) of the backlight unit 340. In this way, the light emitted toward the first display panel 100 from the backlight unit 340 may travel back and forth several times between the first reflective layer 120 and the inner surface of the backlight unit 340 until the light is emitted toward the second display panel 200 through the aperture 125 of the reflective layer 120, thereby increasing the intensity of the light emitted through the aperture 125.

The lateral surface 125a of the aperture 125 of the reflective layer 120 may be obliquely inclined with respect to the surface of the first substrate 110, and the inclination angle "a" between the lateral surface 125a and a surface of the first substrate 110 may be between 0 and 90 degrees, and more particularly from 35 to 55 degrees. By obliquely inclining the lateral surface 125a of the aperture 125 with respect to the surface of the first substrate 110, the transmission efficiency of light passing through the aperture 125 may be increased, and the ratio of light that is passed in the direction substantially perpendicular to the surface of the display panels 100 and 200 may be increased.

The reflective layer 120 may be made of a reflective metal such as aluminum, silver, chromium, or alloys thereof and may be opaque. The reflective layer 120 may include a plurality of apertures 125, and the apertures 125 may be arranged with a uniform distance therebetween.

The transparent body 131a covers the aperture 125 of the reflective layer 120, and may be made of a dielectric material such as an inorganic insulator or an organic insulator. When the refractive index of the first substrate 110 is n1, the refractive index n2 of the transparent body 131a may be in the range of (n1−0.2) to (n1+0.2), more particularly from (n1−0.1) to (n1+0.1). Therefore, the refractive index n2 of the transparent body 131a is substantially close to the refractive index n1 of the first substrate 110 such that total reflection of the light at the interface of the first substrate 110 and the transparent body 131a may be reduced and diffusion of light may be prevented, thereby increasing light transmittance.

The lateral surface 131d of the transparent body 131a may be obliquely inclined with respect to the surface of the first substrate 110 or the surface of the reflective layer 120, and the inclination angle "b" may be between 0 and 90 degrees, more particularly from 35 to 55 degrees. By obliquely inclining the lateral surface 131d of the transparent body 131a with respect to the surface of the first substrate 110 or the reflective layer 120, the transmission efficiency through the transparent body 131a may be increased, and the ratio of light that is passed in the direction substantially perpendicular to the surfaces of the display panels 100 and 200 may also be increased.

The second display panel 200 includes a second substrate 210, a light-blocking layer 220, a shutter 230, and first and second control electrodes 170a and 170b formed on the second substrate 210.

The light-blocking layer 220 may be made of an opaque material and includes an aperture 225 through which the light may pass. The aperture 225 opposes the aperture 125 and may have a position, shape, and size corresponding to the opposing aperture 125. The aperture 225 of the light-blocking layer 220 may be larger or smaller than the aperture 125 of the reflective layer 120. The light-blocking layer 220 may be omitted.

The shutter 230 has a shape and area such that it is capable of covering the aperture 225 of the light-blocking layer 220 or the aperture 125 of the reflective layer 120 and may be made of a material that does not transmit light. The shutter 230 is disposed between the first control electrode 170a and the second control electrode 170b and moves parallel to the surface of the second substrate 210, thereby covering or exposing the aperture 225 or the aperture 125 corresponding thereto. The shutter 230 may be connected to a supporter (not shown) supporting the shutter 230 to be arranged over the first substrate 110 or the second substrate 210 and may be moved. The supporter may have a shape of a leaf spring or a curved spring. The shutter 230 may be used individually, or two or more shutters 230 may be connected to each other. The shutter 230 may be applied with a common voltage.

The first control electrode 170a and the second control electrode 170b are formed on the light-blocking layer 220 and are disposed outside of the boundary of the aperture 225 of the light-blocking layer 220. The first control electrode 170a and the second control electrode 170b may be applied with the common voltage or another suitable voltage.

A MEMS element of the display includes the aperture 225, the aperture 125, the transparent body 131a, the shutter 230, and the first and second control electrodes 170a and 170b disposed on both sides of the shutter 230. One pixel as a unit displaying an image of a display device may include one MEMS or a plurality of MEMS's. A gas such as air may be filled in the space 50 between the first display panel 100 and the second display panel 200.

Next, an example of the operation of the MEMS will be described.

When the shutter 230 and the second control electrode 170b are applied with a first voltage such as the common voltage and the first control electrode 170a is applied with a second voltage different from the first voltage, the shutter 230 and the first control electrode 170a become attracted to each other, and the shutter 230 moves toward the first control electrode 170a and covers the aperture 225 of the light-blocking layer 220, thereby blocking light passing through the transparent body 131a. This state is referred to as an off state. Here, the second voltage applied to the first control electrode 170a may have positive polarity or negative polarity with respect to the first voltage.

When the shutter 230 and the first control electrode 170a are applied with a first voltage such as the common voltage and the second control electrode 170b is applied with a second voltage different from the first voltage, the shutter 230 and the second control electrode 170b become attracted to each other, and the shutter 230 is moves toward the second control electrode 170b and opens the aperture 225, thereby transmitting the light passing through the transparent body 131a. This state is referred to as an on state. Here, the second voltage applied to the second control electrode 170b may have positive polarity or negative polarity with respect to the first voltage.

Next, a display device including the MEMS according to various exemplary embodiments of the present invention will be described with reference to FIG. 2, FIG. 3, FIG. 4, FIG. 5, FIG. 6, FIG. 7, FIG. 8, FIG. 9, FIG. 10, FIG. 11, FIG. 12, and FIG. 13.

Figure 2:
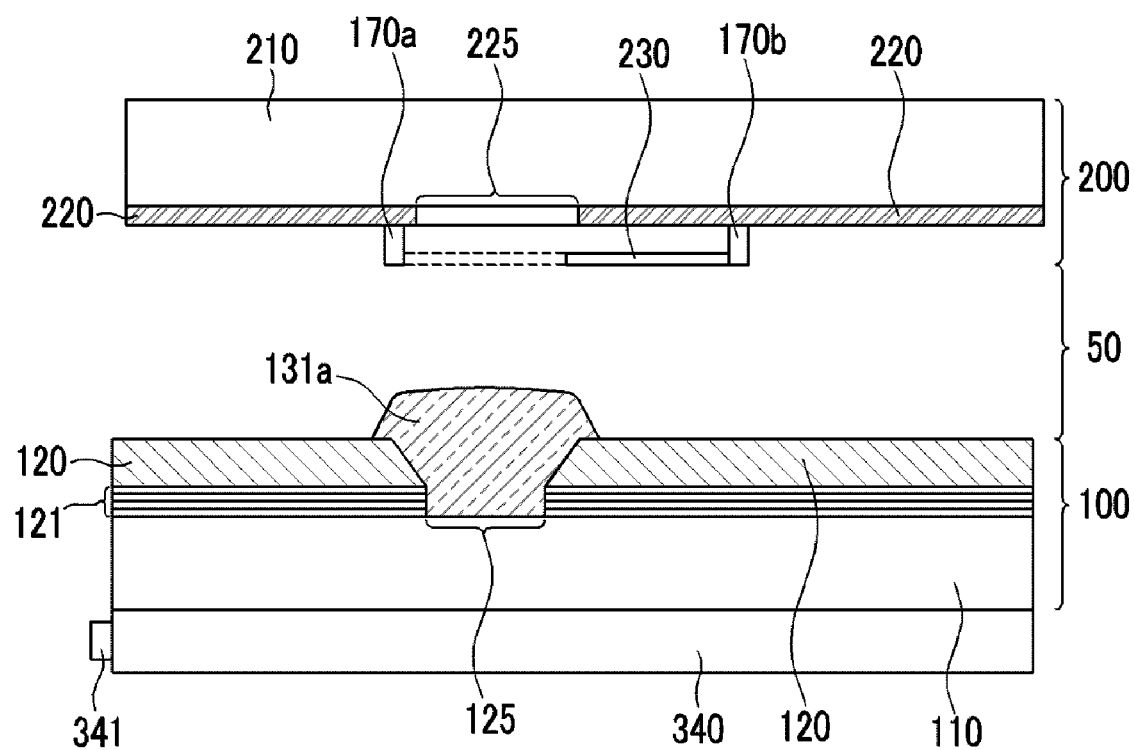
Figure 3:
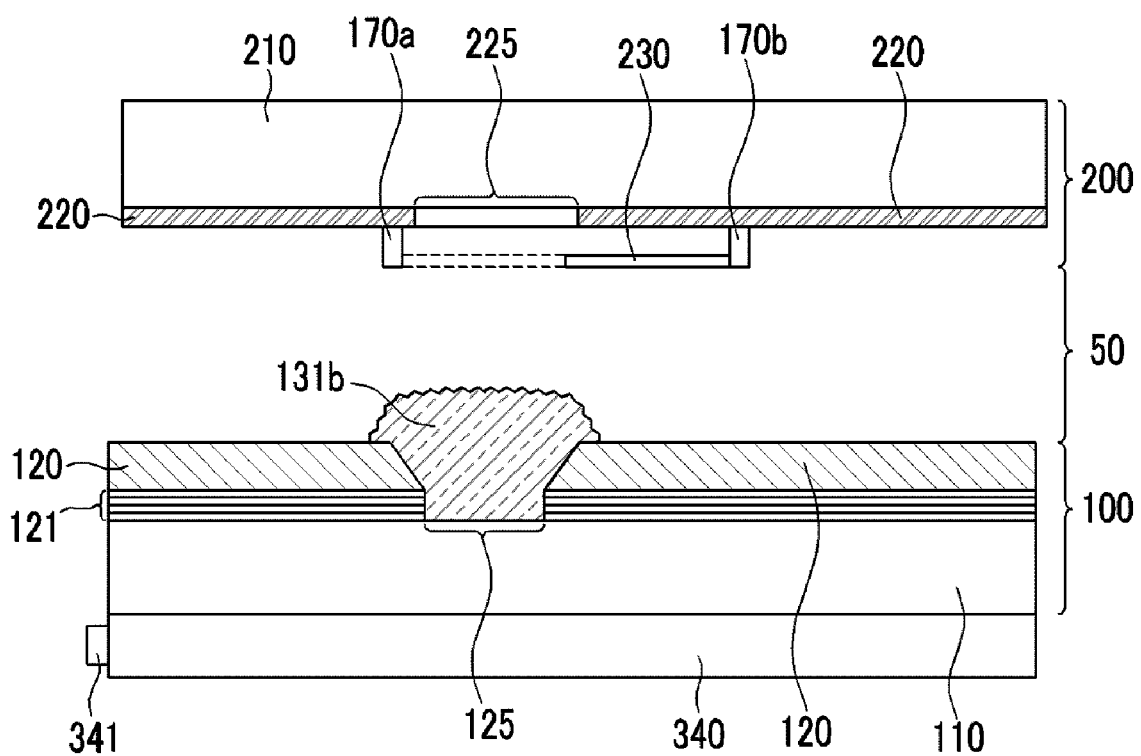
Figure 4:
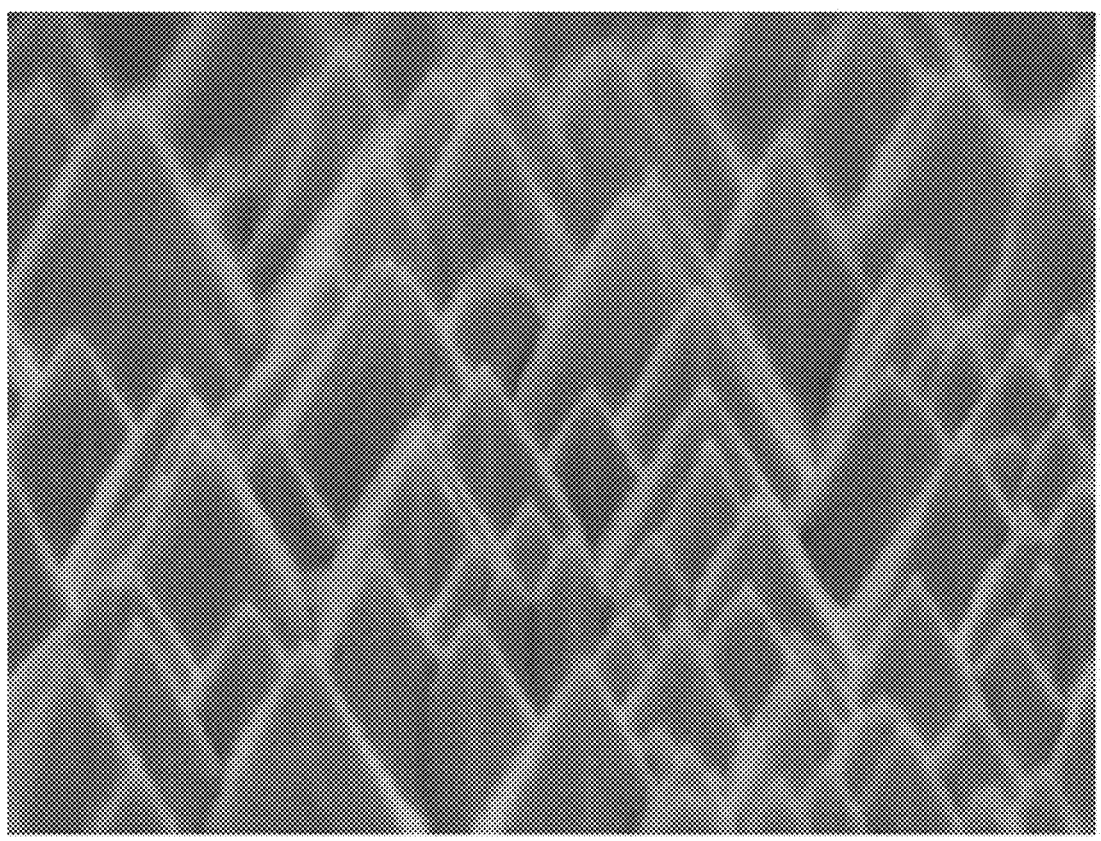
FIG. 4 and FIG. 6 are views showing shapes of a surface of a transparent layer according to exemplary embodiments of the present invention.
Figure 5:
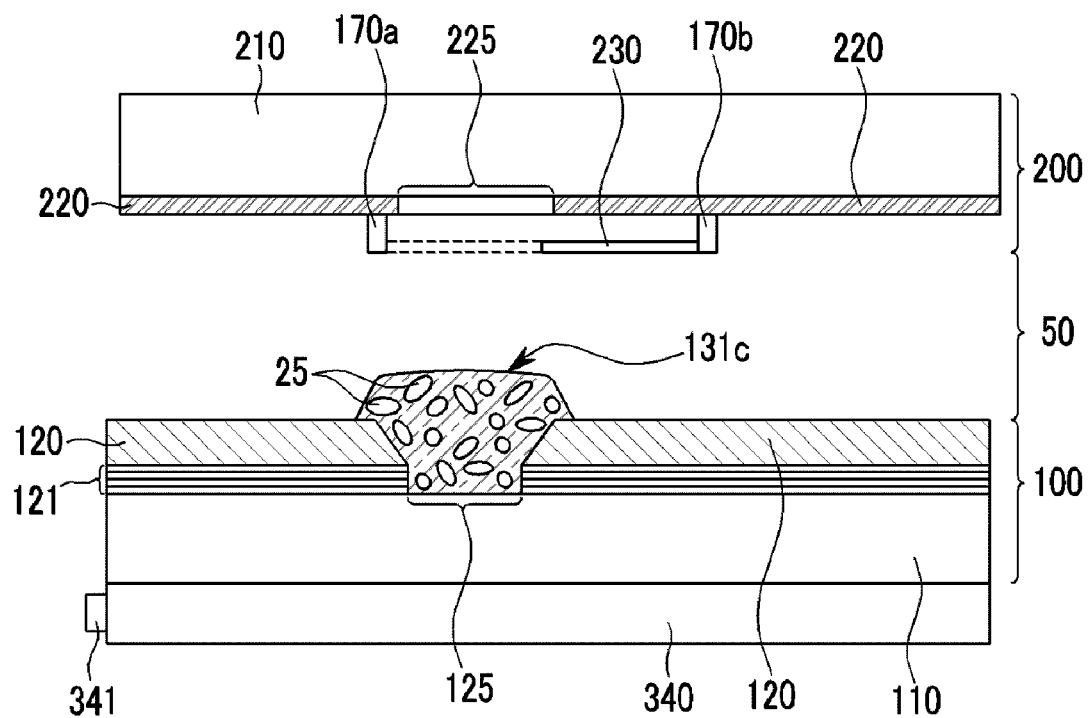
Figure 6:
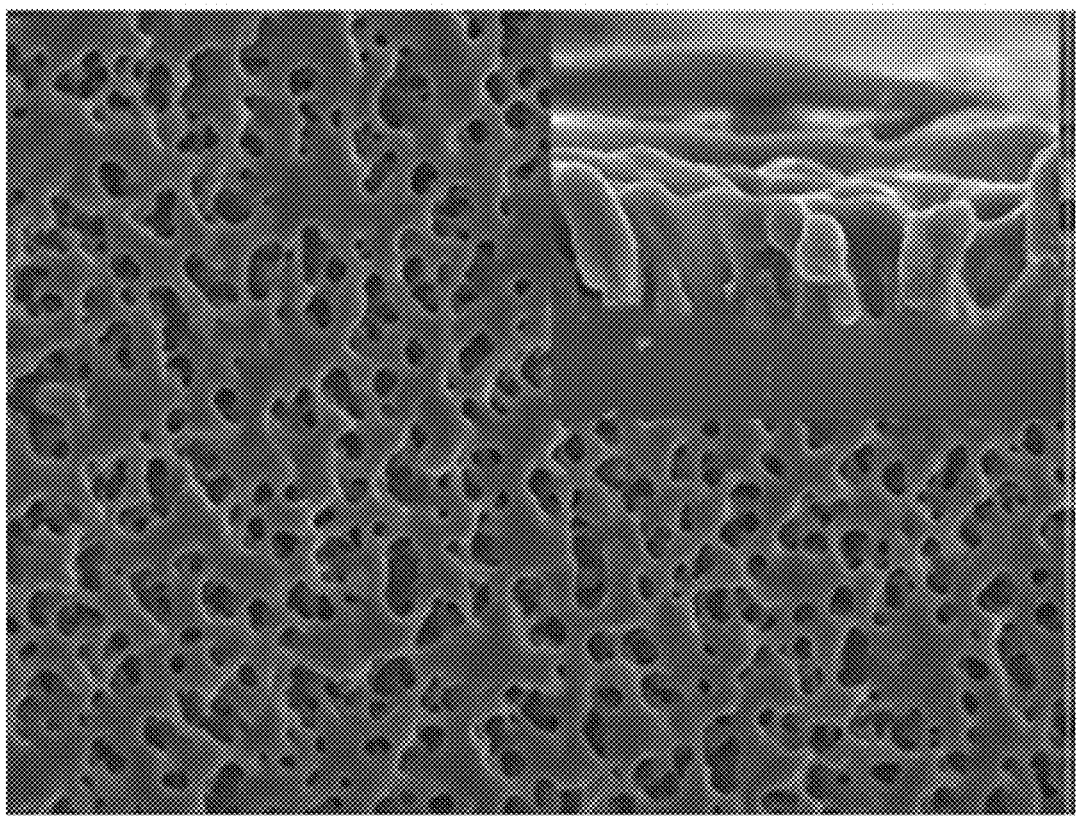

FIG. 2, FIG. 3, FIG. 5, FIG. 7, FIG. 8, FIG. 9, FIG. 10, FIG. 11, FIG. 12, and FIG. 13 are cross-sectional views of a display device using a MEMS according to an exemplary embodiment of the present invention, and FIG. 4 and FIG. 6 are views showing shapes of a surface of a transparent layer according to exemplary embodiments of the present invention.

First, referring to FIG. 2, a display device using a MEMS according to an exemplary embodiment of the present invention is similar to the exemplary embodiment shown in FIG. 1; however, the display device further includes an assistance reflective layer 121 between the first substrate 110 and the reflective layer 120 of the first display panel 100.

The assistance reflective layer 121 may include at least two layers made of insulating materials, and the refractive indices of two neighboring layers among the at least two layers forming the assistance reflective layer 121 may be different from each other. For example, the assistance reflective layer 121 may have a structure in which two layers having different refractive indexes are alternately deposited. Further, the assistance reflective layer 121 may have two layers made of insulating materials such as silicon oxide ($SiO_x$), silicon nitride ($SiN_x$), titanium oxide ($TiO_x$), and titanium nitride ($TiN_x$) that are alternately deposited. The assistance reflective layer 121 may include four layers as shown in FIG. 2 but is not limited thereto.

When an assistance reflective layer 121 is formed under the reflective layer 120, distributed Bragg reflection (DBR) is generated at the assistance reflective layer 121 such that the reflection efficiency of light may be increased at the reflective layer 120.

Referring to FIG. 3 and FIG. 4, the display device including the MEMS according to the present exemplary embodiment is similar to the exemplary embodiment shown in FIG. 2, but the aperture 125 of the reflective layer 120 is covered by a transparent body 131b having a rough surface.

The surface of the transparent body 131b may be rough or uneven, and FIG. 4 shows the shape of the surface of the transparent body 131b according to an exemplary embodiment of the present invention. Such a transparent body 131b may be formed through a method such as a heat treatment or a surface treatment using an etchant or a dry etching gas after forming the transparent body 131a of FIG. 1 and FIG. 2 on the first substrate 110. The surface treatment time may be appropriately regulated when using the wet etching or the dry etching method. Also, the characteristics of the transparent body 131a in the exemplary embodiment of FIG. 1 may be applied to the transparent body 131b of the present exemplary embodiment.

By making the surface of the transparent body 131b rough, the total reflection of light passing through the aperture 125 of the reflective layer 120 at the boundary of the space 50 and the transparent body 131b may be reduced, and the emitting efficiency or light transmittance may be increased by propagating the light in the direction substantially perpendicular to the surface of the display panels 100 and 200.

Referring to FIG. 5 and FIG. 6, the display device including the MEMS has a similar configuration and effect as the exemplary embodiment shown in FIG. 2, but the aperture 125 of the reflective layer 120 is covered by a porous transparent member 131c.

The porous transparent body 131c includes a plurality of holes 25 and may result in a rough surface of the porous transparent body 131c. The surface and the cross-section of the porous transparent body 131c are shown in FIG. 6. Light passing through the aperture 125 of the reflective layer 120 from the backlight unit 340 is scattered by the holes 25 of the porous transparent body 131c, thereby reducing total reflection of the light and increasing light emitting efficiency or light transmittance from the first display panel 100 to the second display panel 200.

Figure 7:
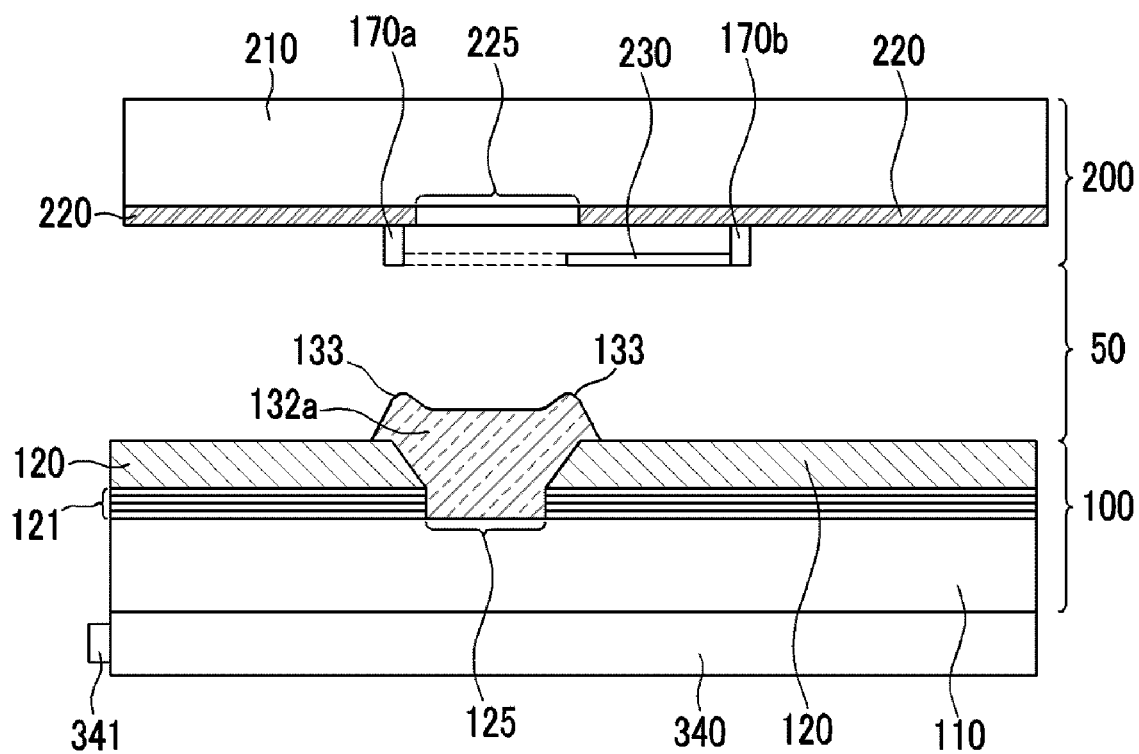

Referring to FIG. 7, the display device including the MEMS according to the present exemplary embodiment has a similar configuration and effect as the exemplary embodiment shown in FIG. 2, but the aperture 125 of the reflective layer 120 is covered by a transparent body 132a including protrusions 133. The protrusion 133 is disposed on the upper portion of the transparent body 132a of the lateral surface 125a of the aperture 125 of the reflective layer 120, and may be formed according to the step difference of the reflective layer 120. In this case, the thickness of the transparent body 132a may be less than the thickness of the transparent body 131a of the exemplary embodiment shown in FIG. 2.

Figure 8:
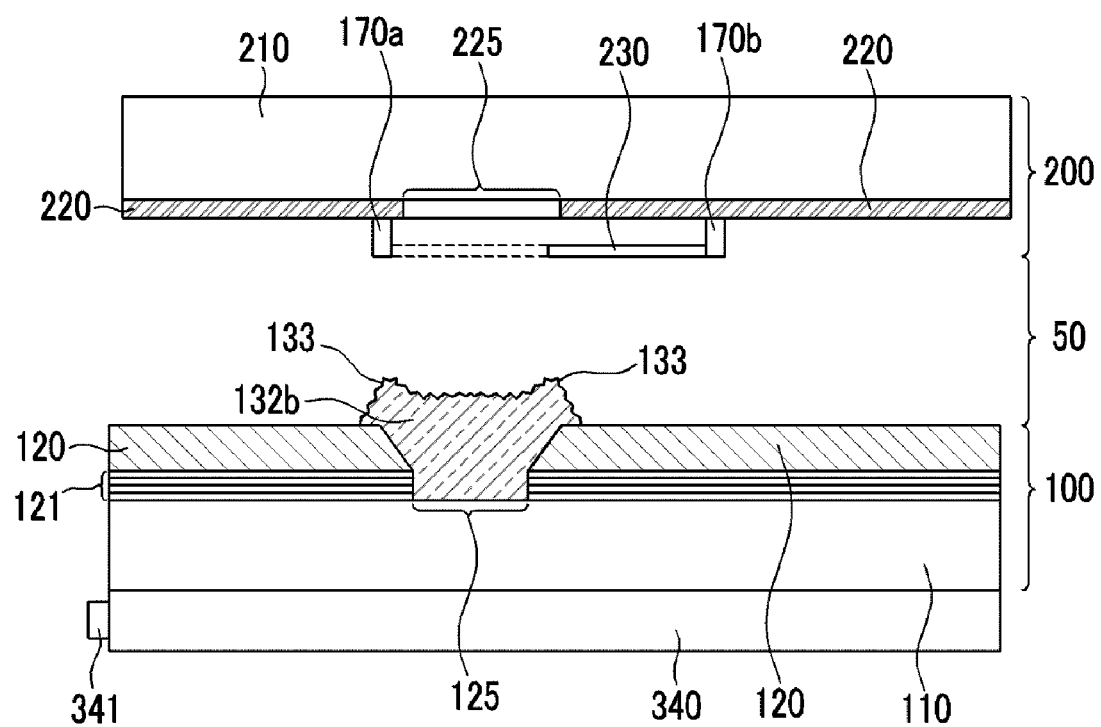

Referring to FIG. 8, the display device including the MEMS according to the present exemplary embodiment has a similar configuration and effect as the exemplary embodiments shown in FIG. 3 and FIG. 4, but the aperture 125 of the reflective layer 120 is covered by a transparent body 132b having a rough surface and includes protrusions 133. The characteristics of the protrusion 133 are the same as those of the exemplary embodiment shown in FIG. 7.

Figure 9:
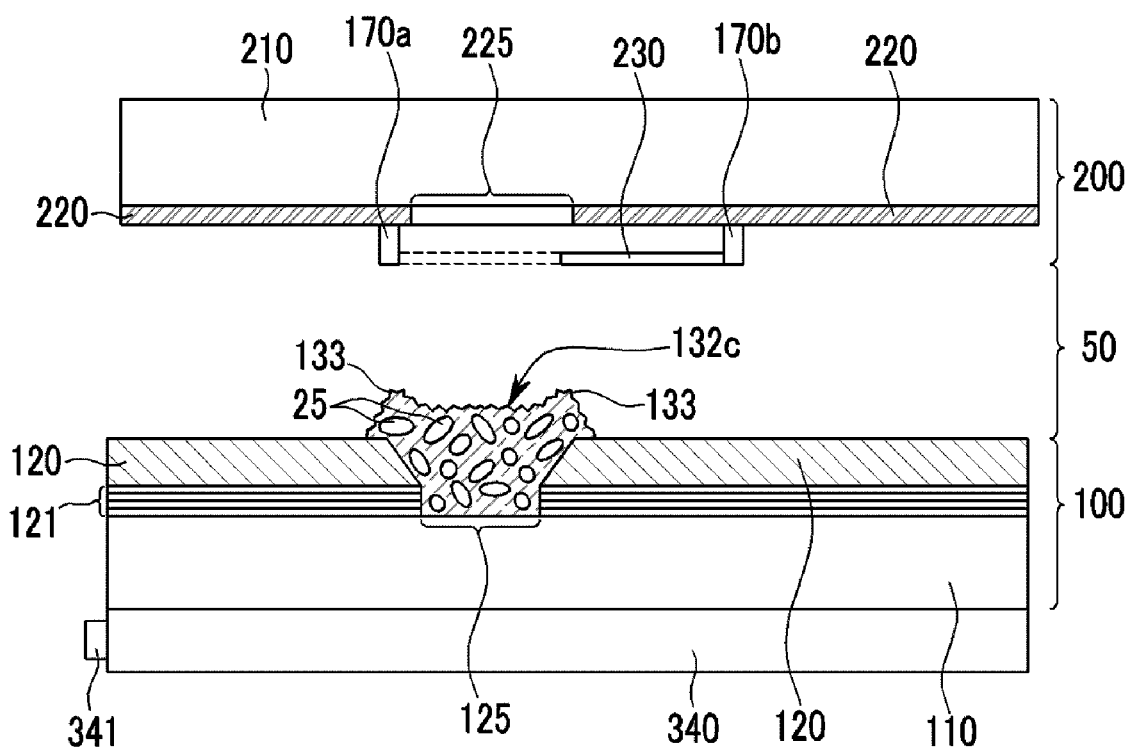

Referring to FIG. 9, the display device including the MEMS according to the present exemplary embodiment has a similar configuration and effect as the exemplary embodiment shown in FIG. 5 and FIG. 6, but the aperture 125 of the reflective layer 120 is covered by a porous transparent body 132c including protrusions 133. The characteristics of the protrusion 133 are the same as those of the exemplary embodiment shown in FIG. 7.

Figure 10:
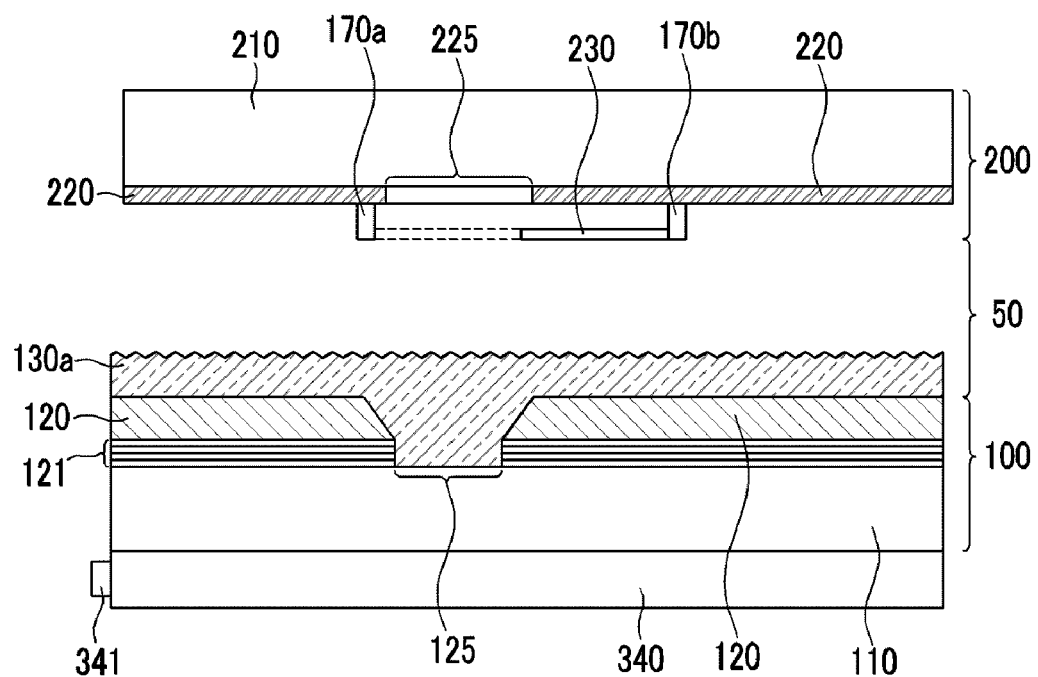

Referring to FIG. 10, the display device including the MEMS according to the present exemplary embodiment has a similar configuration and effect as the exemplary embodiments shown in FIG. 3 and FIG. 4, but a transparent layer 130a having a rough surface covers the whole surface of the reflective layer 120 as well as the aperture 125 of the reflective layer 120. Even though the transparent layer 130a has a rough surface, the surface of the transparent layer 130a may substantially planarize the underlying substrate. The transparent layer 130a may be formed through a method such as a heat treatment or a surface treatment using an etchant or a dry etching gas after coating the material such as the transparent body 131a of FIG. 1 on the whole surface of the reflective layer 120. The transparent layer 130a formed in such a way may be patterned by a photolithographic process to form the transparent body 131b of the exemplary embodiment shown in FIG. 3 and FIG. 4. Also, various characteristics of the transparent body 131b described in the exemplary embodiment of FIG. 3 and FIG. 4 may be applied to the transparent layer 130a of the present exemplary embodiment.

Figure 11:
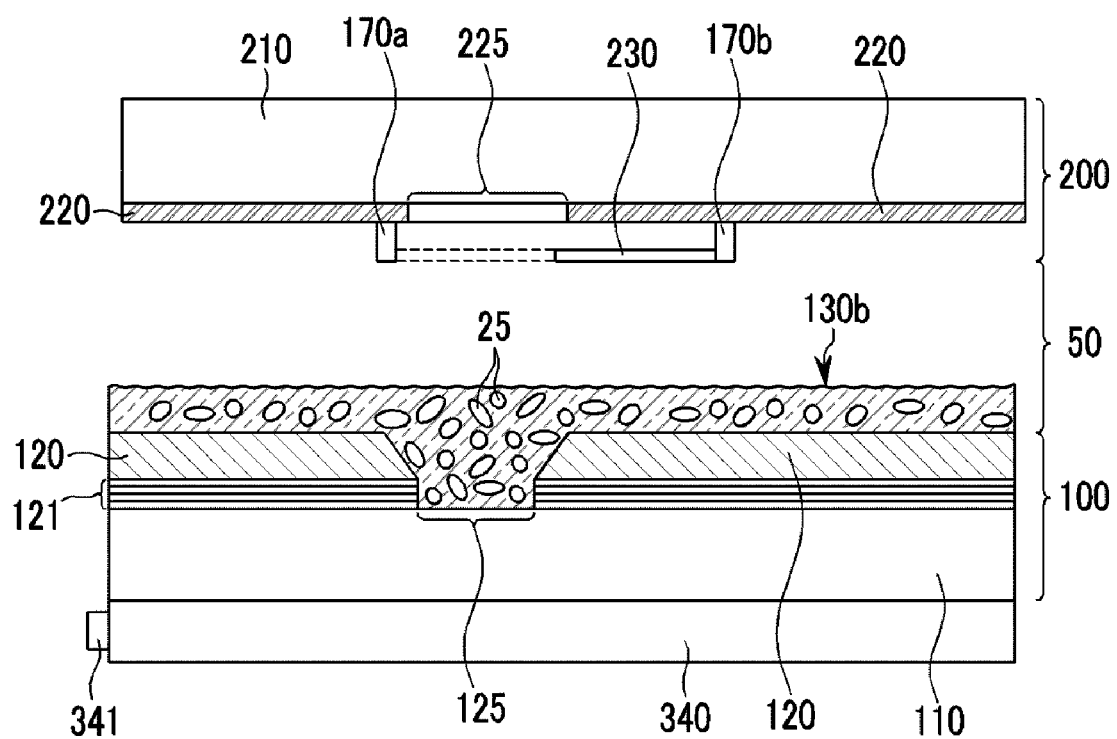

Referring to FIG. 11, the display device including the MEMS according to the present exemplary embodiment has a similar configuration and effect as the exemplary embodiment shown in FIG. 10, but the reflective layer 120 including the aperture 125 is covered by a porous transparent layer 130b. The effect and characteristics of the porous transparent layer 130b are similar to those of the exemplary embodiment shown in FIG. 5 and FIG. 9.

Figure 12:
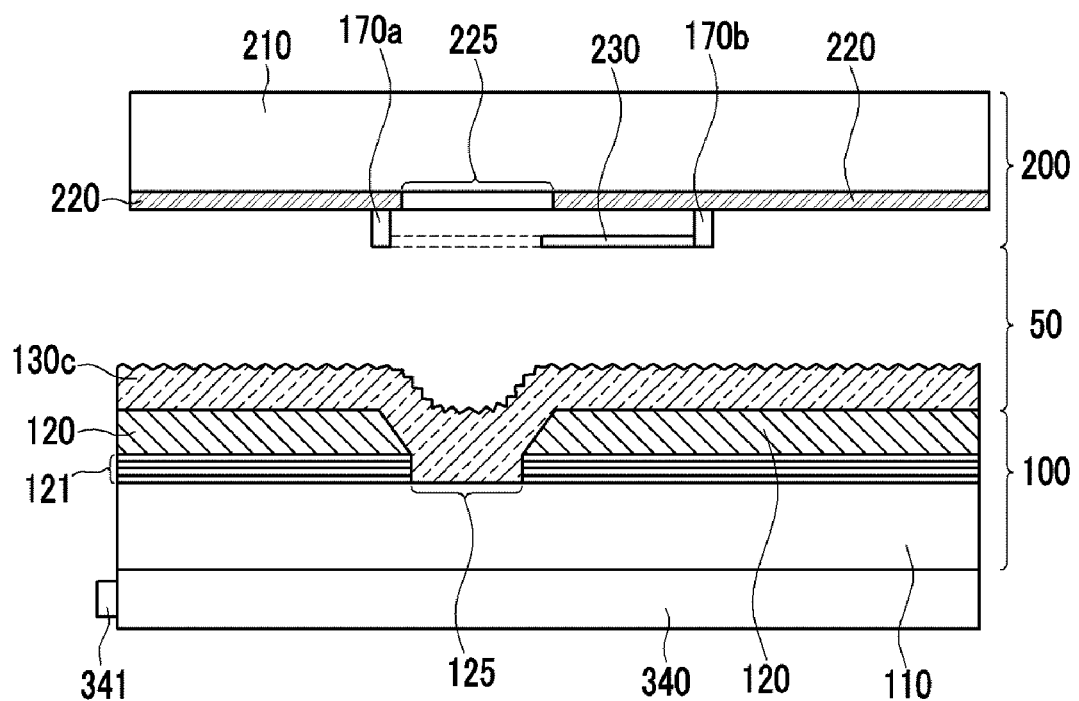

Referring to FIG. 12, the display device including the MEMS according to the present exemplary embodiment has a similar configuration and effect as the exemplary embodiment shown in FIG. 10, but a transparent layer 130c having a rough surface covers the reflective layer 120 without planarizing the underlying substrate. In other words, rather than having a substantially flat upper surface, as in FIG. 10, the contour of the upper surface of the transparent layer 130c corresponds to the contour of the underlying substrate. In this case, the thickness of the transparent layer 130c may be less than the thickness of the transparent layer 130a of the exemplary embodiment shown in FIG. 10.

Figure 13:
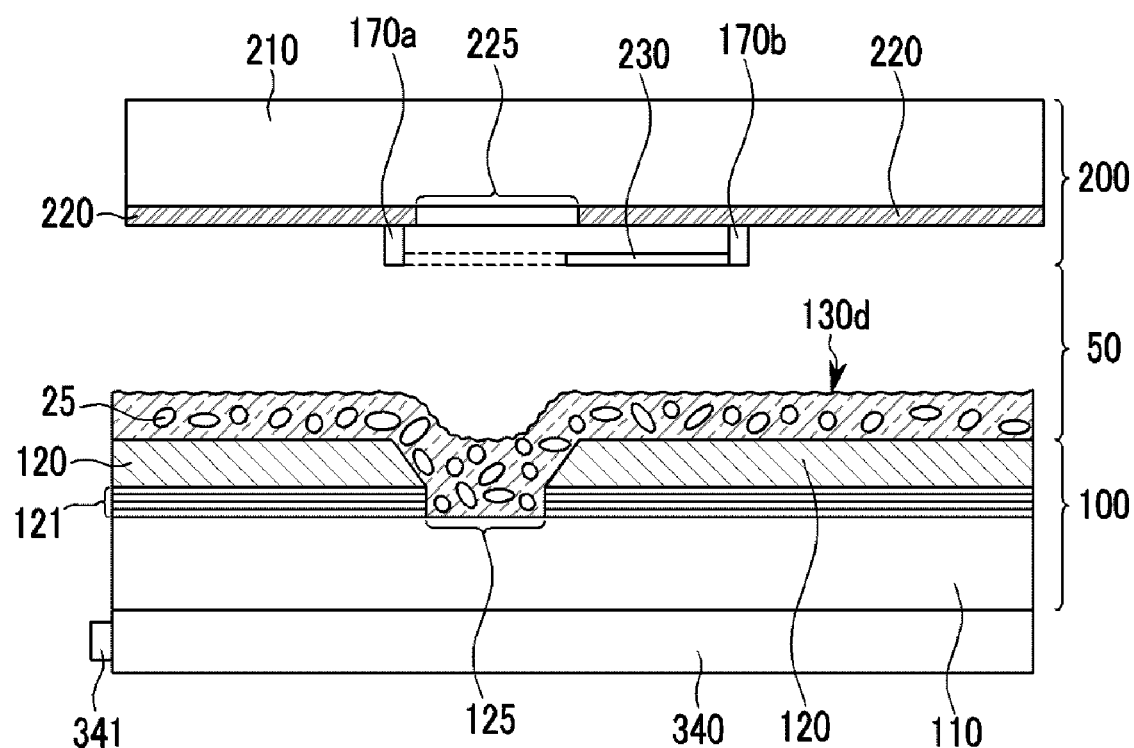

Referring to FIG. 13, the display device including the MEMS according to the present exemplary embodiment has a similar configuration and effect as the exemplary embodiment shown in FIG. 11, but a porous transparent layer 130d having a rough surface covers the reflective layer 120 including the aperture 125. In this case, the thickness of the porous transparent layer 130d corresponding to the aperture 125 may be less than the thickness of the porous transparent layer 130b of the exemplary embodiment shown in FIG. 11. Thus, rather than having a substantially flat upper surface, as in FIG. 11, the contour of the upper surface of the transparent layer 130d corresponds to the contour of the underlying substrate.

Next, a method for manufacturing a display device including a MEMS having a porous transparent body or a porous transparent layer of FIG. 5, FIG. 9, FIG. 11, and FIG. 13 will be described with reference to FIG. 14, FIG. 15, and FIG. 16.

Figure 14:
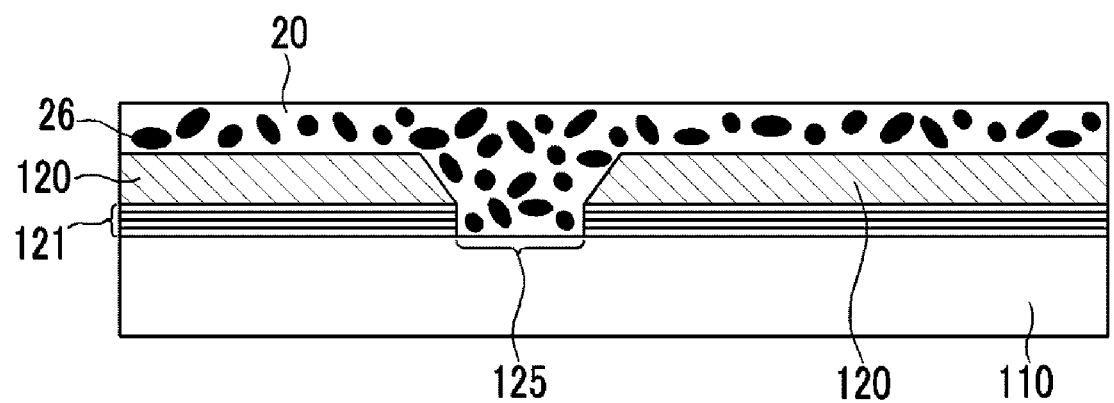
FIG. 14, FIG. 15, and FIG. 16 are cross-sectional views sequentially showing a method of manufacturing a transparent layer or a transparent body according to an exemplary embodiment of the present invention.
Figure 15:
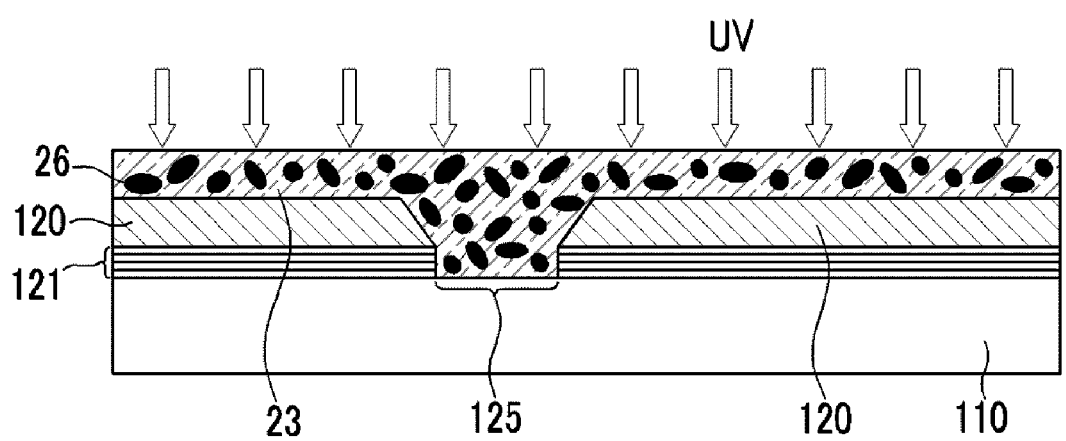
Figure 16:
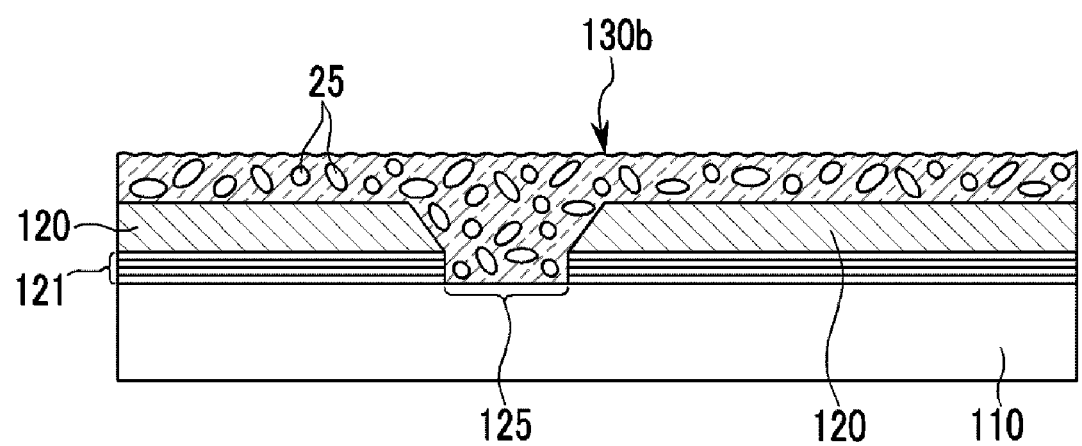

FIG. 14, FIG. 15, and FIG. 16 are cross-sectional views sequentially showing a method of manufacturing a transparent layer or a transparent body according to an exemplary embodiment of the present invention.

First, referring to FIG. 14, insulating materials having different refractive indexes are alternately deposited on the first substrate 110 to form an assistance reflective layer 121, and a reflective metal is deposited thereon to form a reflective layer 120. Then the assistance reflective layer 121 and the reflective layer 120 are patterned to form an aperture 125. Next, a hardening material 20 including a plurality of grains 26 made of a material that is capable of being removed by a wet process such as a photoresist is coated on the reflective layer 120. The hardening material 20 may be a polymer that may be hardened by exposure to radiation such as ultraviolet light or heat, or the hardening material 20 may be generated by a monomer that participates in a polymerization reaction.

Referring to FIG. 15, radiation such as ultraviolet light or heat is applied to the hardening material 20 to form a hardened transparent layer 23, which includes the plurality of grains 26.

Next, referring to FIG. 16, the plurality of grains 26 are removed to form a plurality of holes 25. Accordingly, similar to the exemplary embodiment shown in FIG. 11, a porous transparent layer 130b including a plurality of holes 25 is formed.

The porous transparent body 131c shown in FIG. 5 may be formed by patterning the porous transparent layer 130b that is completed according to FIG. 16. The porous transparent layer 130d shown in FIG. 13 may be formed through the same process as above after coating the hardening material 20 in FIG. 14, and the porous transparent body 132c shown in FIG. 9 may be formed by patterning the porous transparent layer 130d of FIG. 13.

The first display panel 100 manufactured through this process and the second display panel 200 are coupled to each other, and a backlight unit 340 is attached to form a display device using the MEMS according to the various exemplary embodiments of the present invention.

Figure 17:
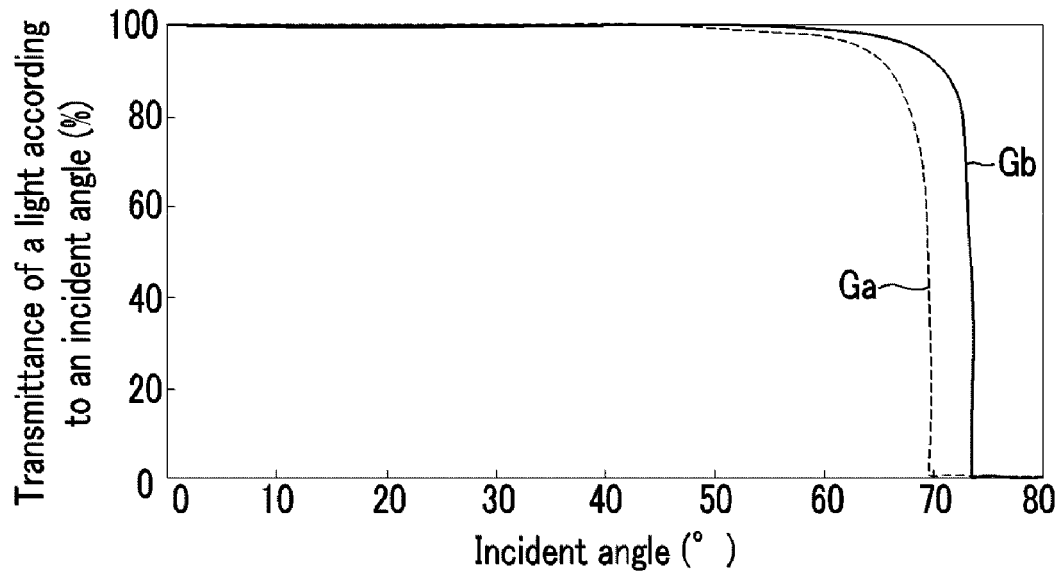
FIG. 17 is a graph showing light transmittance according to incident angles in a display device using a MEMS according to an exemplary embodiment of the present invention.
Figure 18:
FIG. 18 is a graph showing intensity of light according to incident angles in a display device using a MEMS according to an exemplary embodiment of the present invention.

FIG. 17 is a graph showing light transmittance according to incident angles of a display device using a MEMS according to an exemplary embodiment of the present invention, and FIG. 18 is a graph showing intensity of light according to incident angles in a display device using a MEMS according to an exemplary embodiment of the present invention.

The curve Gb of FIG. 17 is a light transmittance curve according to incident angles of a display device using a MEMS formed with the transparent bodies 131a, 131b, 131c, 132a, 132b, and 132c or with the transparent layer 130a, 130b, 130c, and 130d of various kinds according to exemplary embodiments of the present invention. As shown, the light transmittance may be greater at larger incident angles as compared to the curve Ga obtained from conventional display devices.

The curve Gd of FIG. 18 shows the intensity of light according to incident angles of a display device using a MEMS according to an exemplary embodiment of the present invention. The intensity of light is greater at large incident angles as compared to the curve Gc obtained from a conventional display device. The curve Ge shows intensity of light incident at the aperture 125 of the reflective layer 120 according to incident angles.

As described above, in a display device using the MEMS according to an exemplary embodiment of the present invention, transparent bodies 131a, 131b, 131c, 132a, 132b, and 132c or transparent layers 130a, 130b, 130c, and 130d covering the aperture 125 of the reflective layer 120 and having a similar refractive index to that of the first substrate 110 are formed such that total reflection ratio of light passing through the aperture 125 from the backlight unit 340 may be decreased, and the light emitting efficiency or the light transmittance may be increased.

A display device using the MEMS according to an exemplary embodiment of the present invention may have multiple characteristics of the transparent bodies 131a, 131b, 131c, 132a, 132b, and 132c or the transparent layers 130a, 130b, 130c, and 130d according to the various exemplary embodiments in one display device.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display device using a microelectromechanical system (MEMS), comprising:
   a first substrate comprising a refractive first index;
   a second substrate facing the first substrate;
   a reflective layer arranged on the first substrate and comprising a first aperture;
   a transparent layer arranged in the first aperture and comprising a second refractive index; and
   a shutter arranged on the second substrate,
   wherein an upper surface of the transparent layer faces the shutter with a gap therebetween.

2. The display device of claim 1, wherein
   at least one of a first lateral surface of the first aperture and a second lateral surface of the transparent layer is obliquely inclined with respect to a surface of the first substrate.

3. The display device of claim 2, wherein an angle between the surface of the first substrate and at least one of the first lateral surface and the second lateral surface is between 0 and 90 degrees.

4. The display device of claim 2, wherein a surface of the transparent layer is rough.

5. The display device of claim 4, wherein the transparent layer is porous.

6. The display device of claim 5, wherein the transparent layer further comprises a dielectric material.

7. The display device of claim 1, wherein a surface of the transparent layer is rough.

8. The display device of claim 7, wherein the transparent layer is porous.

9. The display device of claim 1, wherein the transparent layer is porous.

10. The display device of claim 1, further comprising: a backlight unit disposed under the first substrate.

11. The display device of claim 10, wherein a surface of the transparent layer is rough.

12. The display device of claim 10, wherein the transparent layer is porous.

13. The display device of claim 1, further comprising: an assistance reflective layer disposed between the first substrate and the reflective layer, wherein the assistance reflective layer comprises: at least two layers comprising different refractive indices from each other; and a second aperture corresponding to the first aperture.

14. The display device of claim 1, further comprising: a light-blocking layer arranged on the second substrate and comprising a third aperture, wherein the third aperture faces the first aperture.

15. The display device of claim 1, wherein the transparent layer is arranged on the entire surface of the reflective layer.

16. The display device of claim 15, wherein a surface of the transparent layer is rough.

17. The display device of claim 15, wherein the transparent layer is porous.

18. The display device of claim 1, wherein a difference between the first refractive index and the second refractive index is equal to or less than 0.2.

19. A method for manufacturing a display device using a microelectromechanical system (MEMS), comprising:
    forming a reflective layer comprising a first aperture on a first substrate;
    forming a transparent layer in the first aperture;
    forming a shutter on a second substrate; and
    coupling the first substrate and the second substrate so that an upper surface of the transparent layer faces the shutter with a gap therebetween.

20. The method of claim 19, wherein forming the transparent layer comprises:
    coating a hardening material comprising a plurality of grains on the first substrate;
    hardening the coated hardening material to form a hardened transparent layer; and
    removing the plurality of grains from the hardened transparent layer.

21. The method of claim 19, further comprising surface treating the transparent layer.

22. The method of claim 19, wherein the first substrate comprises a first refractive index, the transparent layer comprises a second refractive index, and a difference between the first refractive index and the second refractive index is equal to or less than 0.2.

* * * * *